United States Patent [19]

Blatt

[11] Patent Number: 4,596,415

[45] Date of Patent: Jun. 24, 1986

[54] QUICK DISCONNECT DEVICE FOR ACTUATING UNIT AND GRIPPER HEAD

[76] Inventor: Leland F. Blatt, 31915 Groesbeck Hwy., Fraser, Mich. 48026

[21] Appl. No.: 709,899

[22] Filed: Mar. 8, 1985

[51] Int. Cl.[4] ............................................... B66C 3/16
[52] U.S. Cl. ..................................... 294/88; 294/106; 294/115
[58] Field of Search .................. 294/88, 116, 87.24, 294/104, 106, 115, 100, 118; 269/32, 34, 257, 264; 414/739, 751, 753; 901/30, 31, 50

[56] References Cited

U.S. PATENT DOCUMENTS 3,567,208  3/1971  Blatt ....................... 294/88
4,540,212  9/1985  Inaba et al. ............... 294/88

FOREIGN PATENT DOCUMENTS 0118052  8/1984  European Pat. Off. ......... 294/88

Primary Examiner—James B. Marbert
Attorney, Agent, or Firm—Cullen, Sloman, Cantor, Grauer, Scott, & Rutherford

[57] ABSTRACT

In combination with an actuating unit including a cylinder, a head and a reciprocal piston rod and a gripper head having a body terminating in a mount flange, a pivotal gripper assembly and a reciprocal rod end in the body connected to the gripper assembly. A quick disconnect device comprises an apertured protrusion block mounted upon the cylinder head including a pair of opposed undercut assembly slots. An apertured quick disconnect body of U-shape is secured upon the mount flange and upon its interior has a pair of opposed stop ledges. The disconnect body is projected into the assembly slots with the protrusion block nested upon the stop ledges. The actuating unit and gripper head are aligned with the piston rod axially connected to the rod end. A detent pin is removably projected through corresponding aligned transverse bores in the disconnect body and protrusion block.

11 Claims, 4 Drawing Figures

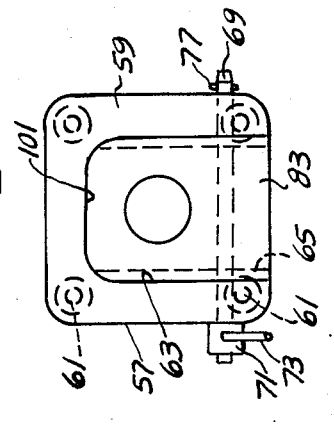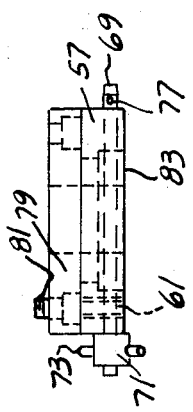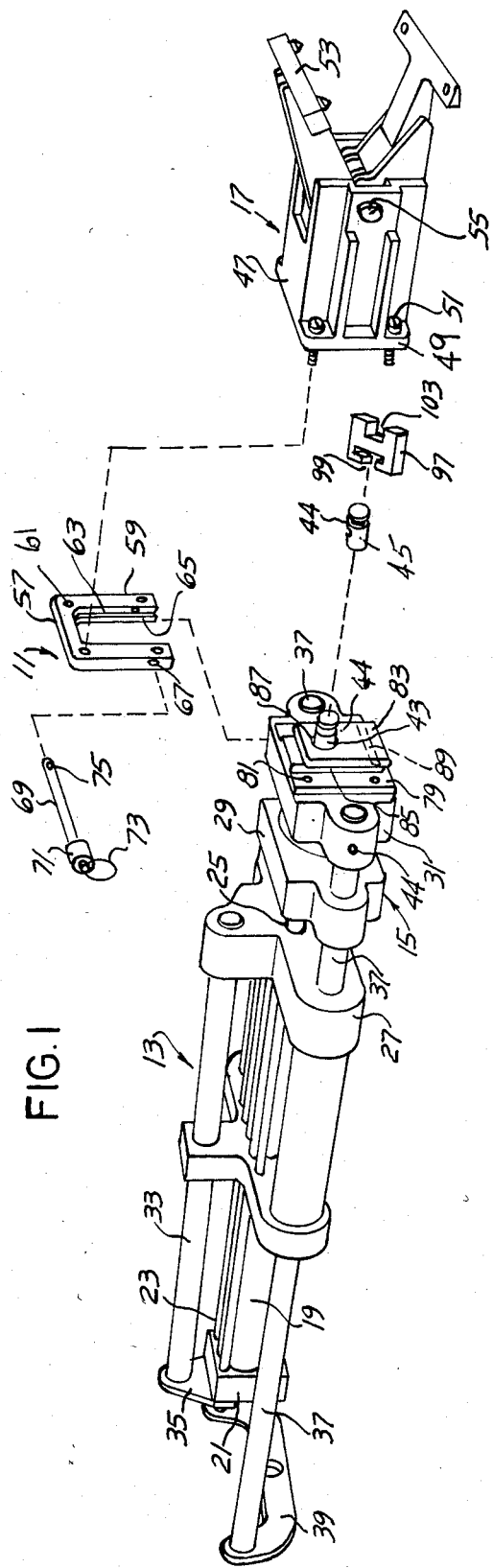

QUICK DISCONNECT DEVICE FOR ACTUATING UNIT AND GRIPPER HEAD

The present invention is directed to a quick disconnect device for interconnecting an actuating unit and a gripper head or other work holder and wherein disconnect is accomplished by the removal of a single detent pin.

BACKGROUND OF THE INVENTION

Heretofore in the workpiece clamp art and the use of actuating devices including pneumatic cylinders having a head, a reciprocal piston rod projecting therefrom for use in conjunction with a gripper head or other jaw operating tool, vacuum head or a similar device, there has normally been a pair of registering similarly apertured mount flanges on the adjacent ends of the actuating unit head and gripper for securing together by at least four fasteners.

The separation and subsequent replacement of a gripper head from an actuating device and reattachment included the arduous task of removing at least four fasteners by which the corresponding mount flanges are separated and disconnected. Upon the reassembly of an actuating device and a gripper head further reattachment of the registering mount flanges again requires a plurality of fasteners, i.e., at least four.

THE PRIOR ART

Illustrative of the prior art and particularly the present actuating unit and the gripper head are one or more of the following patents of the Applicant:

| NAME | PATENT NO. | DATE |
| --- | --- | --- |
| L. F. Blatt | 3,371,583 | 3/5/68 |
| L. F. Blatt | 3,371,953 | 3/5/68 |
| L. F. Blatt | 3,482,831 | 12/9/69 |
| L. F. Blatt | 3,567,208 | 3/2/71 |
| L. F. Blatt | 3,635,514 | 1/18/72 |
| L. F. Blatt | 3,714,870 | 2/6/73 |
| L. F. Blatt | 3,734,303 | 5/22/73 |

SUMMARY OF THE INVENTION

An important feature of the present invention is to provide a quick disconnect device for the assembly and disassembly of an axially aligned actuating unit and a gripper head or the like.

It is an important feature to provide a simple attachment for the respective actuating unit and gripper head such that when the same are interconnected in longitudinal alignment, they may be retained and so connected by the use of a single removable detent pin.

It is an important feature to provide an actuating unit having a cylinder, a head and a reciprocal piston rod projecting therefrom, a disconnect device which includes an apertured protrusion block which receives the piston rod and which is permanently mounted upon the head and includes a pair of opposed undercut assembly slots. The gripper head has a mount flange to which is connected a quick disconnect body of U-shape having a pair of opposed slotted portions defining a pair of stop ledges. The disconnect body and gripper head are assembled over the actuating cylinder head into the assembly slots with the protrusion block retainingly nested upon the stop ledges. A single fastener detent pin is removably projected through corresponding aligned transverse bores in a disconnect body and protrusion block, as a single fastener means of interconnecting and securing the actuating unit and gripper head.

It is a further feature to provide an improved quick disconnect device for an aligned actuating unit and gripper head and wherein the quick disconnector device includes a pair of interlocking elements. One element is a protrusion block mounted upon the cylinder head and includes a pair of opposed undercut assembly slots. The other element is an apertured disconnect body of U-shape which is secured to the mount flange of the gripper head and upon its interior has a pair of slotted portions defining a pair of stop ledges. The disconnect body is assembled into the assembly slots of the protrusion block, and once assembled a single fastener detent pin is removably projected through corresponding aligned transverse bores in a disconnect body and protrusion block and anchored against relative longitudinal movement thereon.

The further feature includes a quick disconnect for any form of actuating unit which includes a head and a reciprocal piston rod, which at its outer end is adapted for axial connection to a corresponding rod end slidably mounted within a gripper head body. The rod end is connected to a linkage or operating mechanism for a gripper assembly which may be one or a pair of gripper jaws pivotally mounted upon the head, and wherein there is employed a quick disconnect assembly by which the actuating unit and a gripper head may be aligned, interconnected and secured together by the use of a single removable detent pin.

The present invention further includes a quick disconnect assembly for a pair of aligned units, one unit being an actuating device and the other being a gripper head and wherein the quick disconnect includes a protrusion block mounted upon the cylinder head and at right angles to its longitudinal axis and has a pair of opposed undercut outwardly opening assembly slots. The quick disconnect device includes a body of U-shape secured upon the mount flange of a gripper head body, with the interior of the disconnect body having a pair of opposed matching slotted portions defining stop ledges. The disconnect body is assembled into the assembly slots with the protrusion block nested within the disconnect body against the stop ledges, with the axes of the respective actuating unit and gripper head being in longitudinal alignment and with the piston rod axially connected to a rod end within the gripper head. The respective disconnect members are interlocked by a removable single fastener detent pin.

As a further feature the head upon the actuating unit may be rotatable, with the protrusion block mounted upon the head further defining the opposed undercut assembly slots adapted to receive the corresponding U-shaped body which is mounted upon the gripper head which is projected into the assembly slots and wherein the protrusion block bears against and is interlocked with the stop ledges upon the U-shaped body. Upon proper assembly of the disconnect elements relative to each other they are secured together by a single fastener detent pin.

These and other features and objects will be seen from the following Specification and claims in conjunction with the appended drawings.

THE DRAWINGS

FIG. 1 is a fragmentary prospective and exploded view of the present actuating unit and gripper head and the quick disconnect device.

FIG. 2 is an end view of the assembled protrusion block, quick disconnect body and the securing detent pin.

FIG. 3 is a plan view thereof.

Figure 4:
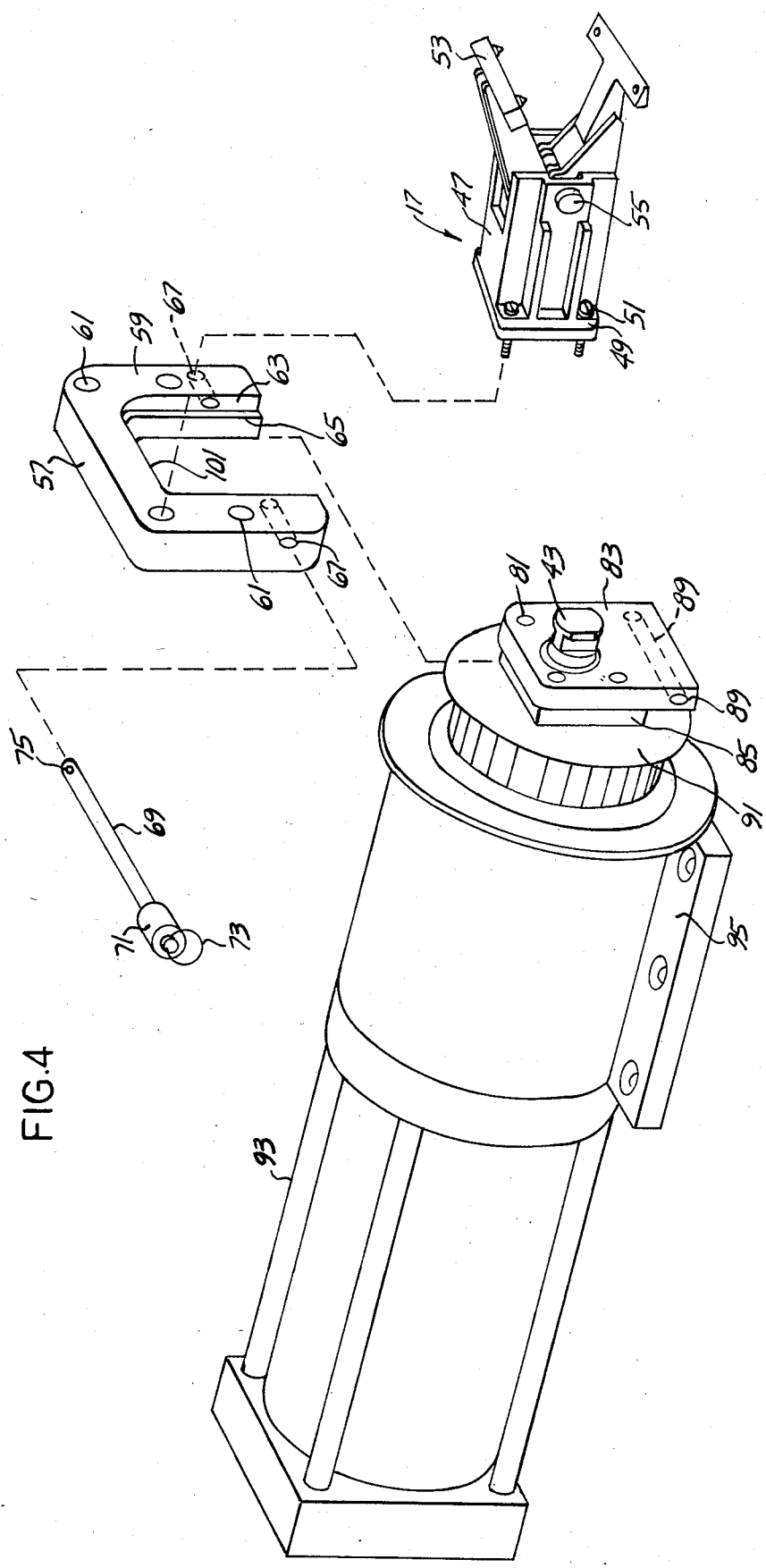
FIG. 4 is a perspective exploded further embodiment of the present invention wherein the actuating unit includes a rotary head upon which the protrusion block is mounted and wherein the corresponding quick disconnect U-shaped body and associated detent pin are on an increased scale.

It will be understood that the above drawings illustrate merely preferred embodiments of the invention and that other embodiments are contemplated within the scope of the claims hereafter set forth.

DETAILED DESCRIPTION OF AN EMBODIMENT OF THE INVENTION

The present quick disconnect device for an actuating unit gripper head is generally indicated at 11, FIG. 1, where in an exploded perspective view there is shown a travel cylinder assembly 13, which is substantially in accordance with U.S. Pat. No. 3,371,583 having a pneumatic actuating unit 15 to which is removably attached the gripper head 17. Said head is substantially in accordance with U.S. Pat. No. 3,371,953, supra.

The aforementioned patents go into the details of the construction and operation of the actuating unit and the gripper head assembly respectively and the disclosure thereof is incorporated hereinto by reference to the extent necessary for a full understanding of the present invention as directed to a quick disconnect means for axially interconnecting and interlocking the actuating unit 15 in registry with the corresponding gripper head 17.

The present invention is not directed to the details of the structure and operation of either the travel cylinder assembly 13 or the gripper head, except for certain portions thereof which cooperate with the present quick disconnect device.

The present disconnect device includes three elements namely, the protrusion block 83 and its corresponding mount plate 79 with undercut laterally opening opposed assembly slots 85 and the inverted U-shaped quick disconnect body 57, which before assembly, is first secured by a plurality of fasteners 51 to the mount flange 49 of gripper head 17, FIG. 1.

As background and illustrative of the travel cylinder assembly 13, there is shown travel cylinder 19 having a pair of longitudinally spaced cylinder heads 21, one of which is shown in FIG. 1, interconnected by a plurality of conventional tie rods 23 and having a reciprocal piston rod 25 connected to a suitable piston within the travel cylinder. The outer end of piston 25 is secured to actuating unit 15 by a suitable connection. Reciprocal movements of the piston rod 25 are adapted to effect corresponding reciprocal movements of the actuating unit 15. The assembly which supports and mounts travel cylinder 19 includes the guide body 27.

The present actuating unit includes a cylinder head 31. Support rod 33 overlies travel cylinder 19 and is connected at its forward end to guide body 27 and at its opposite end by the bracket 35. A pair of reciprocal guide rods 37 are guidably positioned through the guide body 27 and at their one ends are interconnected by the stop plate 39. The guide rods at their forward ends extend through the cylinder body 29 through the cylinder head 31 and are secured thereto by locking pins 44.

The actuating unit includes cylinder body 29 with a cylindrical portion within which is positioned a conventional piston which under suitable pneumatic control is adapted to effect reciprocal movements of piston rod 43 which projects forwardly of the cylinder head 31 and has a T-slot connector 44 upon its outer end. The rod extension 45 is shown in FIG. 1, for axial connection to piston rod 43 and at one end has a similar T-slot connector 44.

For the purpose of the present invention, the actuating unit includes the cylinder assembly 29, the head 31 and the reciprocal piston rod 43.

One form of gripper head 17 is shown in FIG. 1, which is substantially in accordance with the construction in U.S. Pat. No. 3,371,983. The complete detail of structure, function and operation of gripper head 17 is omitted, except to the extent for a full explanation of the operation thereof and the means by which it is removably connected in axial alignment with actuating unit 15.

Gripper head 17 includes a body 47 which at one end terminates in the transverse mount flange 49 suitably apertured at its corners and adapted to receive the corresponding cap screws 51. Said gripper head includes the pivotal gripper assembly 53 having one or a pair of pivotal jaws pivotally connected to body 49 by pivot pin 55.

As forming a part of the gripper head 17, there is shown in the exploded view the rod end 97 which is adapted for connection upon one side with a reciprocal operating linkage means upon the interior of the body 47, so that reciprocal movements of the rod end 97 are adapted to effect corresponding opening and closing movements of jaw assembly 53. This may be one jaw with respect to a stationary jaw or a pair of jaws moving towards and away from each other.

Rod end 97 upon its opposite side includes an undercut T-slot 99, 103 which upon longitudinal alignment and assembly of the gripper head 17 with respect to actuating unit 15 includes an interlock with the T-slotted portion 44 of the piston rod extension 45.

QUICK DISCONNECT DEVICE

The present quick disconnect device includes a U-shaped or bifurcated quick disconnect body 57 having a pair of legs 59 and a plurality of transverse threaded apertures 61 therethough adapted to receive the cap screws or other fasteners 51 for securing body 57 upon mount flange 49 of the gripper head body 47. Interior portions of legs 59 of body 57 are slotted at 63 upon opposite sides to define the stop ledges 65 shown on an enlarged scale in FIG. 4.

Upon the lower ends of legs 59 are a pair of aligned transverse bores 67, sometimes referred to as detent pin holes, adapted to receive the locking detent pin 69, in FIGS. 2 and 3 when assembled with respect to the protrusion block 83. Here said pin extends through the bore 89 of said protrusion block.

The detent pin has a cylindrical head 71 at one end to which is mounted a ring or handle 73 and upon its opposite end a transverse aperture 75 adapted to receive cotter pin 77 for anchoring the detent pin as assembled.

Forming a part of the present quick disconnect device, there is mounted upon the front face of cylinder head 31 the apertured upright protrusion mount plate 79 secured thereto by a plurality of fasteners or cap screws 81. Overlying protrusion mount plate 79 is the protrusion block 83 which extends at right angles to the longitudinal axis of the actuating unit, sometimes referred to as a longitudinal first axis. Between the protrusion block and said mount plate are a pair of undercut outwardly opening laterally spaced assembly slots 85. These slots match slots 63 in body 57.

Said protrusion block and the underlying mount plate 79 are centrally apertured as at 87 and loosely receive the outwardly projecting piston rod 43, FIG. 1. Upon the lower end of protrusion block 83 there is provided a transverse pin aperture or bore 89 adapted to receive detent pin 69 when the corresponding body bores 67 and protrusion block bore 89 are in alignment.

As shown in FIG. 1, the gripper head 17 includes a longitudinal second axis in registry with jaw pivot pin 55 which is brought into alignment with the longitudinal first axis of actuating unit 15, as the gripper head is assembled with respect thereto.

The body 57 is secured to mount flange 49 of gripper head 17. The gripper head 17 is brought into general alignment with actuating unit 15 so that the corresponding quick disconnect U-shaped body 57 projects down into the outwardly opening undercut assembly slots 85 adjacent protrusion block 83.

Upon the interior of body 57 at the top thereof between the stop ledges 65, there is arranged a stop locator or location stop 101. As the U-shaped body 87 is assembled with respect to the protrusion block 83 into the assembly slots 85, when the stop locator 101 engages the top of the protrusion block, the corresponding transverse bores 67 and 89 are in registry and adapted to receive the removable single locking detent pin 69 which extends therethrough, FIG. 2.

On such assembly, the head 71 on the detent pin engages one side of body 57 and the cotter pin 77 projects through the other end of the detent pin in substantial engagement with the other side of body 57.

Once assembled, the detent pin is locked against longitudinal movement with respect to body 57 and the interior retained protrusion block which bears against and is supported upon stop ledges 65.

As gripper head 17 is brought into general alignment with the actuating unit 15, and before the downward assembly of body 57 with respect to the protrusion block, the T-slotted rod extension 45 on one end of the piston rod is initially interlocked with the corresponding slot 99 at the forward end of rod end 97.

As above described the rod end is normally positioned within and slidably mounted upon body 47 generally in alignment with the longitudinal second axis thereof through pivot pin 55 and upon its opposite side as at 103 is pivotally connected to a reciprocal operating means or a linkage for effecting relative pivotal movements of the jaw assembly 53, as disclosed in U.S. Pat. No. 3,371,953.

Once the piston rod 43 and its axial extension 45 is interlocked with rod end 97, then the U-shaped body 57 on head 17 is lowered into the opposed assembly slots 85 adjacent and rearwardly of protrusion block 83, until the stop locator 101 engages the protrusion block. At that time the transverse bores 67 in body 57 and the corresponding bore 89 of the protrusion block are in alignment to cooperatively receive detent pin 69.

In order to effect a quick separation or disconnect of the gripper head 17, whatever its form, with respect to the actuating unit 15, all that is needed is to manually withdraw detent pin 69, first removing cotter pin 77. After disconnection of piston rod 43 and its extension 45 from the rod end 97, the gripper head 17 and its connected U-shaped body 57 are elevated with respect to assembly slots 85 providing a complete and quick disconnect therefrom.

MODIFICATION

In FIG. 4 there is disclosed a modified actuating unit or cylinder assembly 93 with apertured mount flanges 95 upon the outer end of which is a rotable head 91.

The protrusion block 83 corresponds to the protrusion block 83 described with respect to FIGS. 1, 2 and 3 and is mounted forwardly of rotatable head 91 so as to define a pair of outwardly opening positioning slots 85 adjacent protrusion block 83.

The assembly and interlock is exactly the same as above described. The inverted U-shaped body 57 is assembled over and against mount flange 49 of gripper head 17 and secured thereto to cap screws 51.

With the respective longitudinal axes of cylinder assembly 93 and gripper head 17, aligned and the initial connection of the projecting piston rod extension 45 to the corresponding rod end 97, FIG. 1, normally positioned within body 47, the assembly is exactly the same.

The corresponding quick disconnect body 57 now mounted upon gripper head 17, FIG. 4, is projected down within the assembly slots 85 until the locating stop 101 upon body 57 is in cooperative registry with protrusion block 83. At that time, the corresponding transverse bores 67 and 89 are in alignment and receive the detent pin 69, shown assembled in FIGS. 2 and 3.

While one form of actuating unit is shown in FIG. 1 and a different form in FIG. 4, it is contemplated that any type of actuating unit may be employed which normally includes a cylinder assembly having a reciprocal piston rod and a head, whether it be stationary as at 31 in FIG. 1 or rotatable as at 91, FIG. 4. Similarly gripper 17 may be any form of jaw gripper assembly, vacuum head or other device for engagement with a workpiece and which has a corresponding apertured mount flange 49.

U-shaped body 57 is secured to the gripper head 17 FIGS. 2 and 3 and the corresponding protrusion block 83 is connected to the cylinder head 31 of FIG. 1 or the rotating head 91 of FIG. 4.

It is regarded as equivalent that the gripper assembly whatever used, corresponds to the teaching of the present disclosure or any of the listed patents, to the extent that there is provided in conjunction with the actuating unit and a gripper head assembly some form of a quick disconnect device.

With respect to said quick disconnect herein, body 57 is permanently connected to gripper head 17 by fasteners 51. The corresponding protrusion block 83 and its mount plate 79 are permanently attached to the front face of head 31 forming a part of cylinder assembly 29, FIG. 1.

It is easily seen that to quickly change a series of jaws from one jaw unit to another, which may be required for handling various parts, it is much faster by removing a single detent pin than removing and reassembling the unit with the conventional four cap screws.

Having described my invention, reference should now be had to the following claims:

I claim:

1. In combination with an actuating unit including a cylinder, a head on the cylinder and a reciprocal piston rod projecting outwardly of the head upon a longitudinal first axis;

and a gripper head having a body terminating in an apertured mount flange, a pivotal gripper assembly mounted upon and projecting forwardly of the body and reciprocal operating means in the body connected to the gripper assembly, arranged upon a longitudinal second axis;

a quick disconnect device comprising an apertured protrusion block receiving said piston rod mounted upon said head in a plane at right angles to said first axis, including a pair of opposed undercut assembly slots;

an apertured quick disconnect body of U-shape secured upon said mount flange in a plane at right angles to said second axis;

the interior of said quick disconnect body having a pair of opposed slotted portions defining a pair of stop ledges;

the disconnect body being assembled over said head into said assembly slots with said protrusion block nested within the disconnect body upon its stop ledges;

the first and second axes being in alignment with the piston rod axially connected to said gripper assembly operating means;

and a single fastener detent pin removably projected through corresponding aligned transverse bores in said disconnect body and protrusion block and anchored in position.

2. In the quick disconnect device of claim 1, said protrusion block including an apertured protrusion mount plate bearing against said head, underlying said protrusion block;

and fastening means securing said mount plate to said head, said assembly slots being interposed between said mount plate and protrusion block.

3. In the quick disconnect device of claim 1, the securing of said quick disconnect body upon said gripper mount flange including a plurality of fasteners extending through said mount flange and into said disconnect body.

4. In the quick disconnect device of claim 1, said gripper operating means including a rod end on said second axis, axially assembled over and interconnected with said piston rod for reciprocal movements therein.

5. In the quick disconnect device of claim 1, said protrusion block having a central aperture receiving said piston rod and a transverse bore;

said disconnect body having a pair of aligned opposed anchor bores aligned with said transverse bore;

said detent pin extending through said aligned bores.

6. In the quick disconnect device of claim 5, said detent pin having a head on one end engaging said disconnect body;

and a fastener extending through the other end of said pin engageable with said disconnect body, said pin being constrained against longitudinal movement relative to said disconnect body and protrusion block.

7. In the quick disconnect device of claim 4, said rod end having an undercut T-slot, said piston rod having a T-shaped end connector, said rod end T-slot interlocking and receiving said piston rod end connector.

8. In the quick disconnect device of claim 5, a stop locator upon said disconnect body between its stop ledges for engagement with said protrusion block slidably positioning said disconnect body so that said bores are in alignment.

9. In the quick disconnect device of claim 1, the head upon said cylinder being rotatable.

10. In combination with an actuating unit including a cylinder, a head and a reciprocal piston rod projecting outwardly of the head upon a longitudinal first axis;

and a gripper head having a body terminating in an apertured mount flange, a pivotal gripper assembly mounted upon the body and reciprocal operating means in the body connected to the gripper assembly, arranged upon a longitudinal second axis;

a quick disconnect device comprising an apertured protrusion block receiving said piston rod mounted upon said head, including a pair of opposed undercut assembly slots;

an apertured quick disconnect body of U-shape secured upon said mount flange;

the interior of said quick disconnect body having a pair of opposed slotted portions defining a pair of stop ledges adjacent said gripper head;

the disconnect body being slidably assembled upon said head into said assembly slots with said protrusion block nested within the disconnect body upon its stop ledges;

the first and second axes being in alignment with the piston rod axially connected to said gripper assembly operating means;

and a single fastener detent pin removably projected through corresponding aligned transverse bores in said disconnect body and protrusion block and anchored in position.

11. In combination with an actuating unit including a head arranged upon a longitudinal first axis;

and a gripper head having a body terminating in an apertured mount flange, a workpiece gripper assembly mounted upon said body, said body being arranged upon a longitudinal second axis;

a quick disconnect device comprising an apertured protrusion block mounted upon said actuating unit head in a plane at right angles to said first axis, including a pair of opposed undercut assembly slots;

an apertured quick disconnect body of U-shape secured upon said mount flange in a plane at right angles to said second axis;

the interior of said quick disconnect body having a pair of opposed slotted portions defining a pair of stop ledges;

the disconnect body being assembled into said assembly slots with said protrusion block nested within the disconnect body upon its stop ledges, the first and second axes being in alignment;

and a single fastener detent pin removably projected through corresponding aligned transverse bores in said disconnect body and protrusion block and anchored in position.

* * * * *